(12) United States Patent
Sasahara

(10) Patent No.: US 12,026,029 B2
(45) Date of Patent: Jul. 2, 2024

(54) INFORMATION PROCESSING APPARATUS, METHOD OF CONTROLLING INFORMATION PROCESSING APPARATUS, AND NON-TRANSITORY STORAGE MEDIUM

(71) Applicant: CANON KABUSHIKI KAISHA, Tokyo (JP)

(72) Inventor: Naoto Sasahara, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/900,529

(22) Filed: Aug. 31, 2022

(65) Prior Publication Data

US 2023/0074612 A1  Mar. 9, 2023

(30) Foreign Application Priority Data

Sep. 6, 2021  (JP) .................. 2021-144414

(51) Int. Cl.
*G06F 1/26* (2006.01)
*G06F 13/40* (2006.01)
*H04N 1/00* (2006.01)

(52) U.S. Cl.
CPC .......... *G06F 1/266* (2013.01); *G06F 13/4068* (2013.01); *H04N 1/00904* (2013.01); *G06F 2213/0042* (2013.01); *G06F 2213/3812* (2013.01); *Y02D 10/00* (2018.01)

(58) Field of Classification Search
CPC ........ G06F 1/263; G06F 1/266; G06F 1/3253; G06F 1/3296; G06F 13/4068; G06F 2213/0042; G06F 2213/3812; H04N 1/00904; Y02D 10/00
See application file for complete search history.

(56) References Cited

U.S. PATENT DOCUMENTS

| 11,385,696 | B2 | 7/2022 | Sato | |
|---|---|---|---|---|
| 2015/0362984 | A1* | 12/2015 | Waters | G06F 1/266 713/324 |
| 2016/0116928 | A1* | 4/2016 | Motoki | G05F 1/575 323/280 |
| 2017/0288558 | A1* | 10/2017 | Perchlik | H02M 3/33592 |
| 2017/0346284 | A1* | 11/2017 | Lee | G06F 1/26 |

(Continued)

FOREIGN PATENT DOCUMENTS

JP  2019105922 A  6/2019

OTHER PUBLICATIONS

Triano, Alex. "Basics of Power Mux". Oct. 2020. Texas Instruments Incorporated. (Year: 2020).*

(Continued)

*Primary Examiner* — Thomas J. Cleary
(74) *Attorney, Agent, or Firm* — ROSSI, KIMMS & McDOWELL LLP

(57) ABSTRACT

According to an aspect of the present disclosure, an image forming apparatus checks a connection status of devices to an USB host interface, and then turns off once a GPIO controlling a Vbus of interfaces to which USB devices are not connected, and then turns on the GPIO (that is, writing an enable signal "1" after writing a disable signal "0"), and then remove a cutoff state of electrical connection with the USB devices by a overcurrent preventing mechanism.

7 Claims, 6 Drawing Sheets

(56) References Cited

U.S. PATENT DOCUMENTS

| | | | | |
|---|---|---|---|---|
| 2017/0353114 | A1* | 12/2017 | Deboy | H02M 1/08 |
| 2017/0366092 | A1* | 12/2017 | Langeslag | H02M 3/33523 |
| 2019/0033953 | A1* | 1/2019 | Kadgi | G06F 13/4282 |
| 2019/0179393 | A1* | 6/2019 | Sato | G06F 1/28 |
| 2019/0199088 | A1* | 6/2019 | Tsujii | H02H 3/087 |
| 2019/0227609 | A1* | 7/2019 | Koshigaya | G06F 1/266 |
| 2019/0278731 | A1* | 9/2019 | Mattos | G06F 1/266 |
| 2019/0319409 | A1* | 10/2019 | Vispute | H01L 27/0266 |
| 2019/0319446 | A1* | 10/2019 | Mondal | H02H 1/0007 |
| 2021/0263878 | A1* | 8/2021 | Vispute | G06F 1/266 |
| 2022/0244770 | A1* | 8/2022 | Lorin | G06F 13/4068 |
| 2022/0308649 | A1* | 9/2022 | Hosono | G06F 1/305 |
| 2022/0368221 | A1* | 11/2022 | Nagano | H02H 3/202 |
| 2023/0017285 | A1* | 1/2023 | Shinoda | H02M 3/157 |
| 2023/0246645 | A1* | 8/2023 | Waters | H03K 19/00346 |
| | | | | 326/26 |

OTHER PUBLICATIONS

Arar, Steve. "How to Enable USB-C Power Exchanges With and Without Power Delivery". Aug. 22, 2020. All About Circuits. Retrieved from Internet Sep. 12, 2023. <https://www.allaboutcircuits.com/news/how-to-enable-usbc-power-exchanges-with-without-power-delivery>. (Year: 2020).*

* cited by examiner

INFORMATION PROCESSING APPARATUS, METHOD OF CONTROLLING INFORMATION PROCESSING APPARATUS, AND NON-TRANSITORY STORAGE MEDIUM

BACKGROUND

Field

The present invention relates to an information processing apparatus such as an image forming apparatus mounting an USB host controller, a method of controlling the information processing apparatus, and a non-transitory storage medium.

Description of the Related Art

In recent years, information processing apparatuses equipped with interfaces (I/Fs) of Universal Serial Bus (hereinafter referred to as "USB") have become popular. It is known that such information processing apparatuses are connected with an external device such as a USB storage device, a USB card reader or a USB keyboard via a USB interface (I/F), and supplies power to these external devices via a Vbus line.

Japanese Patent Application Laid-Open No. 2019-105922 discloses a circuit having a mechanism for cutting off an electrical connection with an external device if an overcurrent is detected during the connection with the external device via the USB I/F (i.e., the overcurrent preventing mechanism).

There are various types of external devices connected via the USB, and there are some external devices in which electric charge remains for a while due to capacitors or the like even if the power supply is stopped.

If the apparatus is shifted to a power-saving state with such external devices connected, an overcurrent can be generated because the input side has a low potential and the output side has a high potential. Therefore, there is a possibility that an external device cannot be used after returning from the power-saving state in a device mounted with a circuit similar to the circuit of Japanese Patent Application Laid-Open No. 2019-105922. This is because the overcurrent preventing mechanism is activated when the apparatus is shifted to the power saving state while the external device maintaining a high potential is connected.

The present invention has been made to solve the above objective. The present invention allows a USB host I/F to supply power for external devices when returning to a normal state from the power saving state, and allows the external devices connected to the USB host I/F to become usable.

SUMMARY

According to an aspect of the present disclosure, an information processing apparatus comprises: a power source that may be in first and second power states, the power source providing a lower potential in the second power state compared to the first power state; an USB host interface connected to the power source and operable to supply power to an external device, the USB host interface including a circuit having: a switching mechanism that turns on/off the power supply based on a predetermined signal; and an overcurrent preventing mechanism that electrically cut off a connection with the external device if detecting a state of overcurrent generated during the connection with the external device through the USB host interface; and a controller configured to output first and second signals, the first signal being output to the circuit for turning off the power supply when the power source in the second power state returns to the first power state, and the second signal being output for turning on the power supply after the first signal is output, wherein the circuit removes the cutoff of electrical connection if the second signal is input after the first signal is input under the cutoff state of the electrical connection with the external device by the overcurrent preventing mechanism.

Further features of the present invention will become apparent from the following description of exemplary embodiments with reference to the attached drawings.

DESCRIPTION OF THE EMBODIMENTS

The embodiments of the present invention will now be described with reference to the drawings. The following embodiment does not limit the present invention recited in claims, and not all of the combinations of features described in the embodiment are essential for achieving the objective of the invention.

Figure 1:
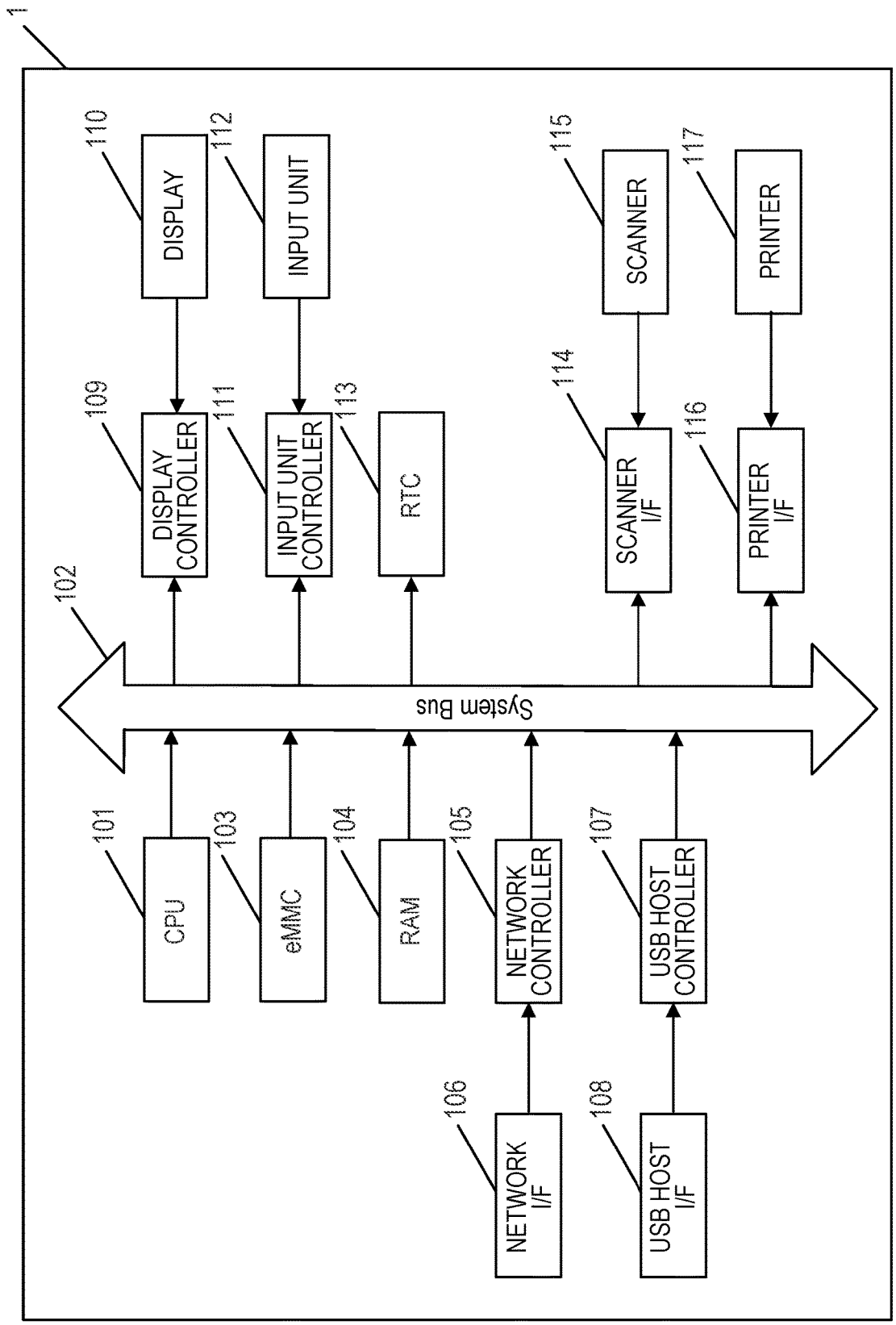
FIG. 1 is a schematic diagram of the hardware configuration of the image forming apparatus according to the embodiment.

FIG. 1 is a schematic diagram showing an example of the hardware configuration of the image forming apparatus 1 showing an embodiment of the information processing apparatus according to the present invention.

In the image forming apparatus 1, a CPU 101 is a central processing unit for operating software that is used to operate the image forming apparatus 1. A system bus 102 serves as a path for the CPU 101 to access other units and for the other units to access each other.

An eMMC (embedded Multi Media Card) 103 is a nonvolatile storage device for storing software of the image forming apparatus 1, data necessary for operating the image forming apparatus 1, and temporary files, etc. Although FIG. 1 shows an example using eMMC, other non-volatile storage devices such as HDD (Hard Disk Drive) or SSD (Solid State Drive) may be used.

A RAM (Random Access Memory) 104 is used as a work area of the CPU 101. Programs of the image forming apparatus 1 are deployed in the RAM 104. In addition, variables used when operating the program and data transferred from each unit through DMA (Direct Memory Access) are also stored in the RAM 104.

A network interface (network I/F) 106 is used for connecting the image forming apparatus 1 with the network. A network controller 105 controls communications between the image forming apparatus 1 and other devices on the network.

An USB host interface (USB host I/F) 108 is used for connecting the image forming apparatus 1 with USB devices. The USB host controller 107 controls communications between the image forming apparatus 1 and the USB devices. In the example of FIG. 1, only one USB host I/F 108 is described but there are actually multiple USB host interfaces. The USB host I/F 108 is connected to USB devices through USB cables. Depending on types of the USB devices, the USB cables are not used but directly connected to the USB host I/F 108.

A display 110 exhibits an operation status of the image forming apparatus 1 so that a user can confirm the operation status. The display controller 109 performs display control of the display 110.

An input unit 112 receives an instruction from a user to the image forming apparatus 1. An input unit controller 111 controls the input unit 112. Specifically, the input unit 112 is an input system including input devices such as a keyboard, a mouse, 10 keys, a cursor key, a touch panel, and a keyboard. If the input unit 112 is a touch panel, the input unit 112 is physically mounted on the surface of the display 110.

A real-time clock (RTC) 113 performs functions such as a clock function, an alarm function, or a timer function of the image forming apparatus 1.

A scanner 115 is connected to the image forming apparatus 1 via the system bus 102 and a scanner I/F 114. A printer 117 is connected to the image forming apparatus 1 via the system bus 102 and a printer I/F 116.

Figure 2:
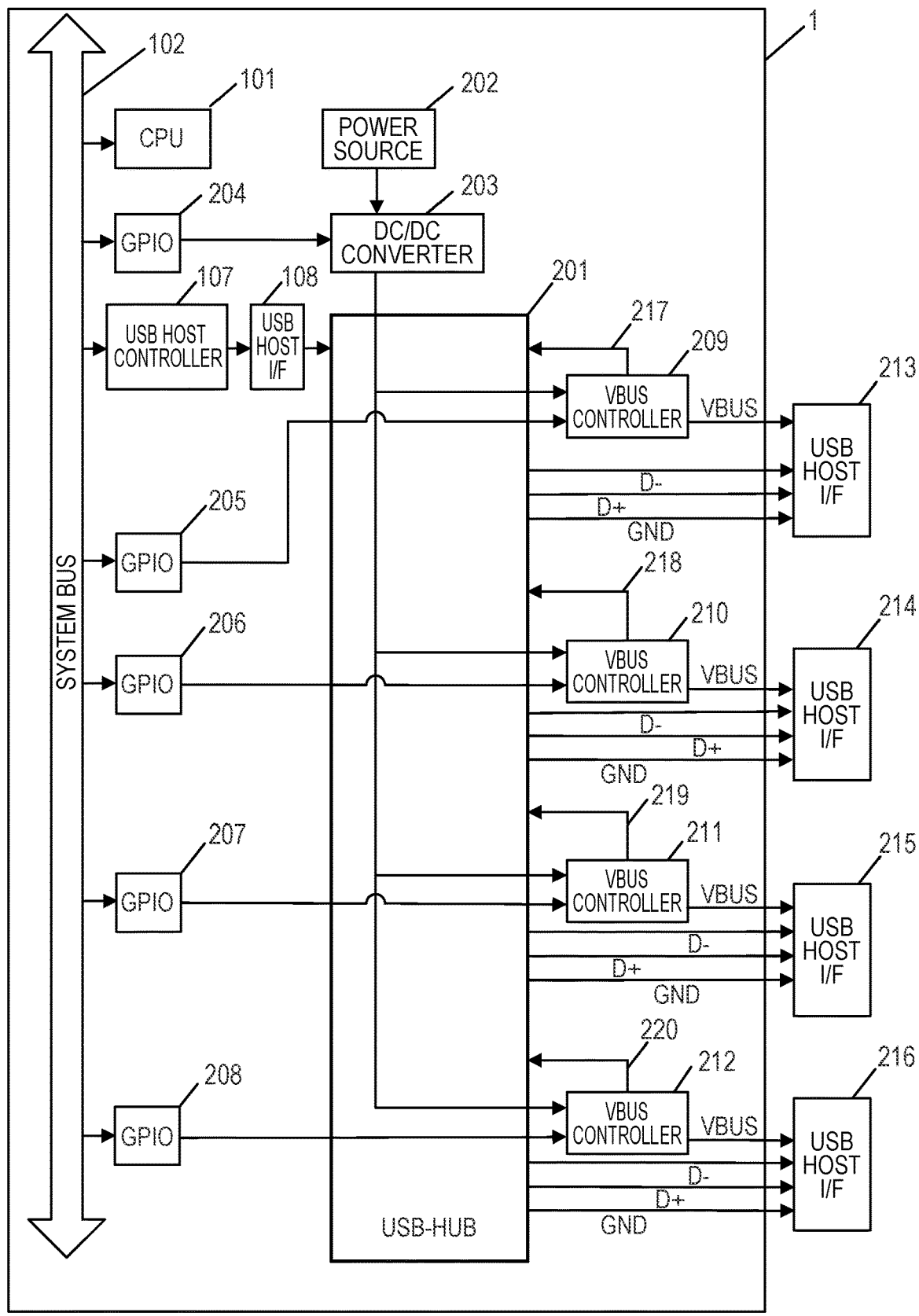
FIG. 2 is a diagram showing the configuration of the USB host I/F mounted on the image forming apparatus and a diagram showing the circuit configuration for controlling Vbus of each USB host I/F.

FIG. 2 is a diagram showing an example of the configuration of the USB host I/F mounted on the image forming apparatus 1 and the configuration capable of controlling the Vbus of each USB host I/F. In FIG. 2, the same reference numerals as those in FIG. 1 are assigned to the same components.

The USB host controller 107 operates according to an instruction from the CPU 101 and communicates with USB devices connected to the respective USB host I/Fs.

In the example shown in FIG. 2, the USB host controller 107 is connected with an USB-HUB 201 via the USB host I/F 108, and the USB host I/Fs are connected with the USB-HUB 201. However, the USB host I/Fs may be directly connected to the USB host controller 107.

The USB-HUB 201 has a function for relaying communications between the USB host controller 107 and each USB device connected to the USB host I/Fs (213 to 216). Multiple USB devices can be connected to the USB host controller 107 via the USB-HUB 201. For example, in the USB 2.0 standard, a host is connected with a device are through four lines. The four lines consist of a Vbus line and a GND line for supplying power, and a D+ line and a D− line as data lines for performing communications. The data lines must be connected to a USB host controller, but the electric power is supplied through the Vbus line using a different path.

If USB devices are connected to each USB host I/F (213 to 216), the CPU 101 acquires information on the USB devices through the USB host controller 107. The acquired information includes a vendor ID, a product ID, a class ID, and the like, and the CPU 101 assigns proper device drivers to the respective USB devices and performs control based on the acquired information. The device drivers used by the image forming apparatus 1 include a HID driver, a storage driver, a WLAN driver, a general driver, a HUB driver, and the like.

The power supplied to the Vbus of each USB host I/F (213 to 216) is generated from a power source 202 via a DC/DC converter 203. The power generated by the DC/DC converter 203 is input to the Vbus controller (209 to 212). Outputs from GPIOs (205 to 208) are also input to the Vbus controller (209 to 212). The term "GPIO" stands for "general-purpose input/output". The Vbus controller (209 to 212) performs logical multiplication of the two inputs using an AND circuit. Then, the power is input to each USB host I/F (213 to 216). With this configuration, each GPIO (205 to 208) is controlled by the CPU 101 to turn on/off the Vbus power supplied to the USB host I/Fs (213 to 216).

The CPU 101 can switch operation modes of the DC/DC converter 203 by controlling the GPIO 204.

Further, the CPU 101 can control power supply from the power source 202 to the DC/DC converter by transmitting a stop command signal and a return signal to the power source 202. When receiving the stop command signal from the CPU 101, the power source 202 stops power supply for the DC/DC converter 203. When receiving the return signal from the CPU 101, the power source 202 starts supplying power for the DC/DC converter 203. Thus, the power supply unit including the power source 202 and the DC/DC converter 203 can provide a first power state in which power is supplied to the Vbus of the USB host I/F and a second power state in which a lower potential is provided compared to the first power state (a state in which no electric power is supplied for the Vbus of the USB host I/F).

Another power source for operating the entire image forming apparatus 1 is provided separately from the power source 202 (not shown), but descriptions thereof will be omitted.

Figure 3:
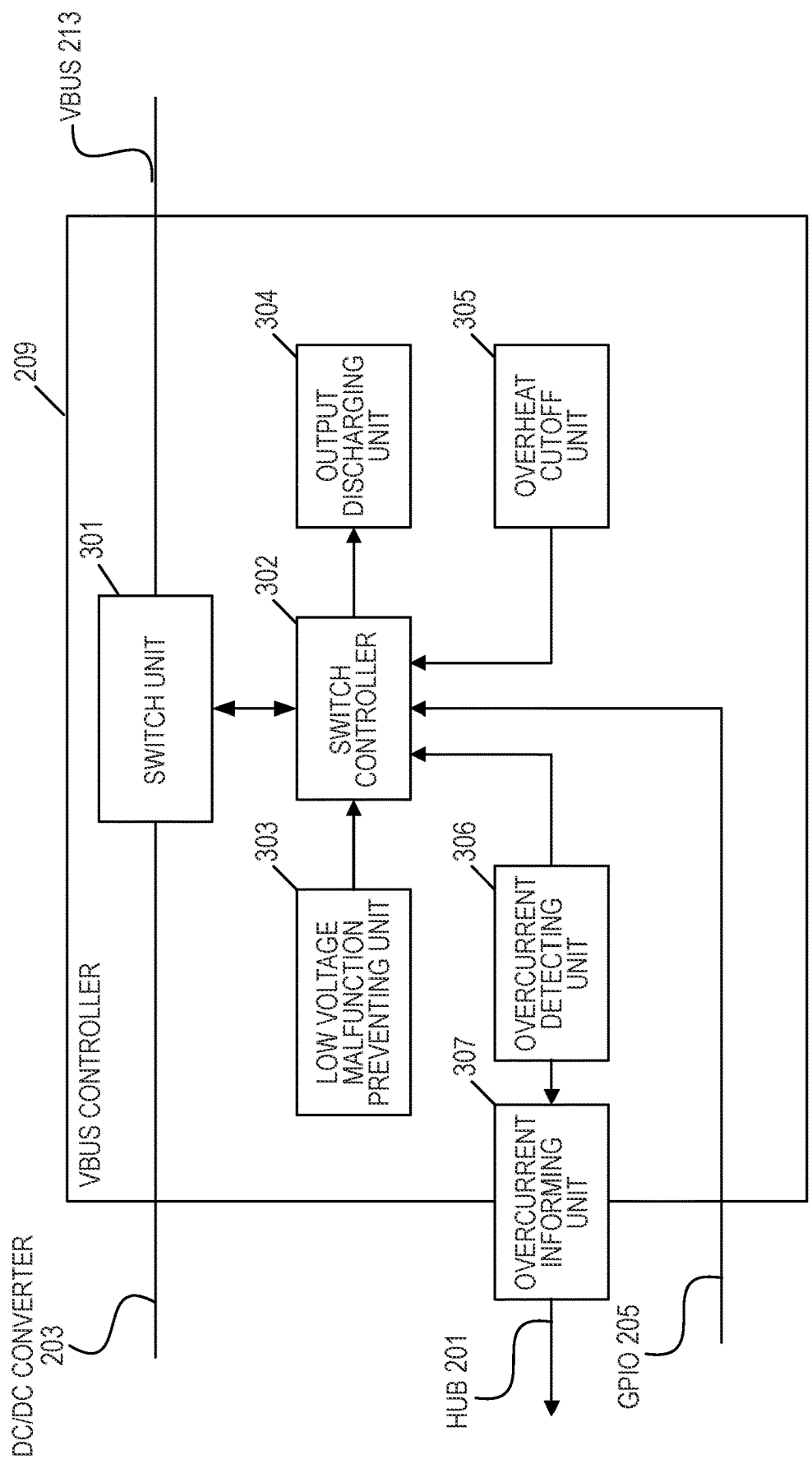
FIG. 3 shows the detailed internal configuration of the Vbus controller.

FIG. 3 shows an example of the detailed internal structure of the Vbus controller 209.

The upstream current is supplied from the DC/DC converter 203, and the downstream current is supplied to the Vbus of the USB host I/F 213 via the switch unit 301. The switch unit 301 is a circuit for controlling conduction of the Vbus current based on an input signal from a switch controller 302.

The switch controller 302 switches the conductive/non-conductive state of the switch unit 301 in response to an enable input signal and a disable input signal from a low voltage malfunction preventing unit 303, an overheat cutoff unit 305, an overcurrent detecting unit 306, and the GPIO 205. The switch controller 302 performs discharge control of the USB downstream current by notifying the output discharging unit 304 when the switch unit 301 is turned off.

The low voltage malfunction preventing unit 303 is a circuit that notifies the switch controller 302 if the input voltage on the upstream side of the USB decreases more than a predetermined voltage from the output voltage on the downstream side. Upon receiving the notification, the switch controller 302 controls the switch unit 301 to shift to the non-conductive state (that is, the switch controller 302 cuts off the electrical connection between the USB upstream side and the USB downstream side by using the switch unit 301).

The overcurrent detecting unit 306 is a circuit that notifies the switch controller 302 and an overcurrent informing unit 307 if the current value flowing upstream or downstream of the USB is equal to or higher than a predetermined threshold value. Upon receiving the notification, the switch controller 302 controls the switch unit 301 to shift to the non-conductive state. Upon receiving the notification, the overcurrent informing unit 307 outputs a Vbus error signal to the HUB 201.

The overheat cutoff unit 305 is a circuit that notifies the switch controller 302 if the Vbus controller 209 reaches a predetermined temperature or higher. Upon receiving the notification, the switch controller 302 controls the switch unit 301 to shift to the non-conductive state.

Some of the external devices connected via USB have charges left inside for a while due to capacitors or the like included in the external devices even if the power of the supply source is turned off. In such external devices, the input-side voltage may temporarily become lower than the output-side voltage, which may result in generating an overcurrent inside. The image forming apparatus 1 has a mechanism for preventing the generation of the overcurrent by controlling the switch unit 301 to shift to the non-conductive state (a state in which the electrical connection is cut off) as described above if a state in which an overcurrent is generated is detected while the USB device is connected.

If the switch unit 301 is controlled to shift to the non-conductive state by the switch controller 302, the switch unit 301 can be returned to the conductive state by the GPIO 205 once transmitting a disable signal to the switch controller 302 and then transmitting an enable signal. According to the present embodiment, the CPU 101 writes "1" in the GPIO 205 to transmit the enable signal to the switch controller 302, and writes "0" in the GPIO 205 to transmit a disable signal to the switch controller 302.

As shown above, the Vbus controller 209 includes a circuit including the mechanism for turning on/off the power supply to the Vbus of the USB host I/F 213 and the overcurrent preventing mechanism.

Although only the Vbus controller 209 has been described herein, the Vbus controllers 210, 211, and 212 have the same internal configurations.

Figure 4:
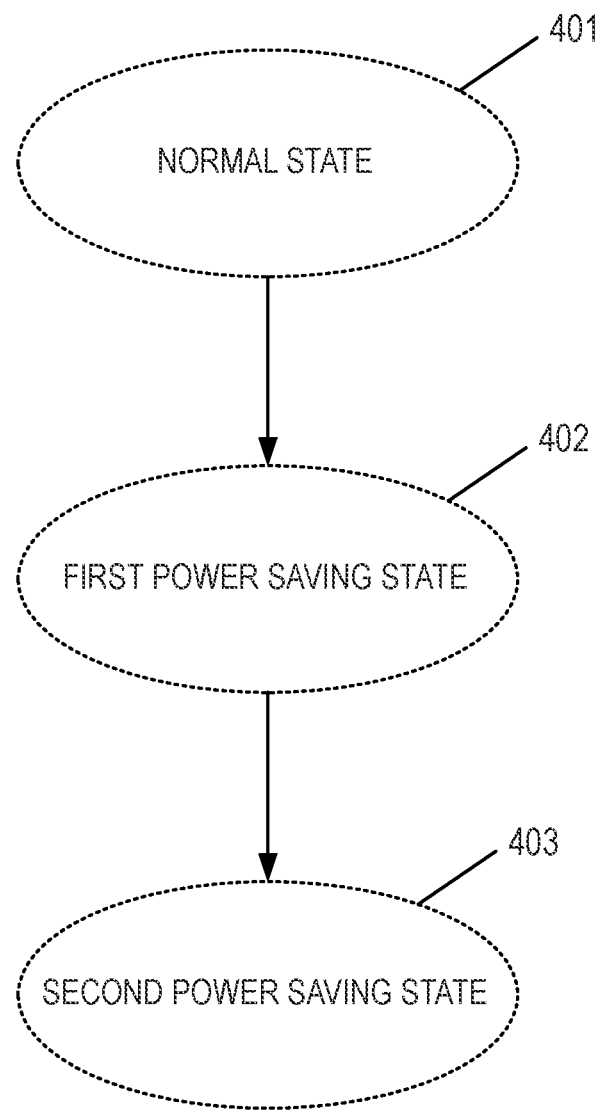
FIG. 4 is a diagram showing the power state transition of the image forming apparatus.

FIG. 4 is a diagram describing the power state of the image forming apparatus 1.

The image forming apparatus 1 can be in a normal state (401) where electric power is supplied for all devices, a first power saving state (402) where the power supply is cut off for some of devices, and a second power saving state (403) providing a further higher power saving effect than the first power saving state (402).

In the first power saving state (402), the power supply is cut off for the display 110, the display controller 109, the input unit 112, the input unit controller 111, the scanner 115, the scanner I/F 114, the printer 117, the printer I/F 116, and the USB host I/F 108. In the second power saving state (403), the power supply is further cut off for the CPU 101.

Next, the operation of the image forming apparatus 1 according to the present embodiment will be described with reference to the flowcharts of FIGS. 5 and 6. The processes shown in these flowcharts are implemented by the CPU 101 deploying a program (software for operating the image forming apparatus 1) stored in the eMMC 103 into the RAM 104 to execute the program. Hereinafter, unless otherwise specified, the described processing is executed by the CPU 101.

First, the processing in a case where the operation of the image forming apparatus 1 is shifted from the normal state (401) to the first power saving state (402) will be described.

Figure 5:
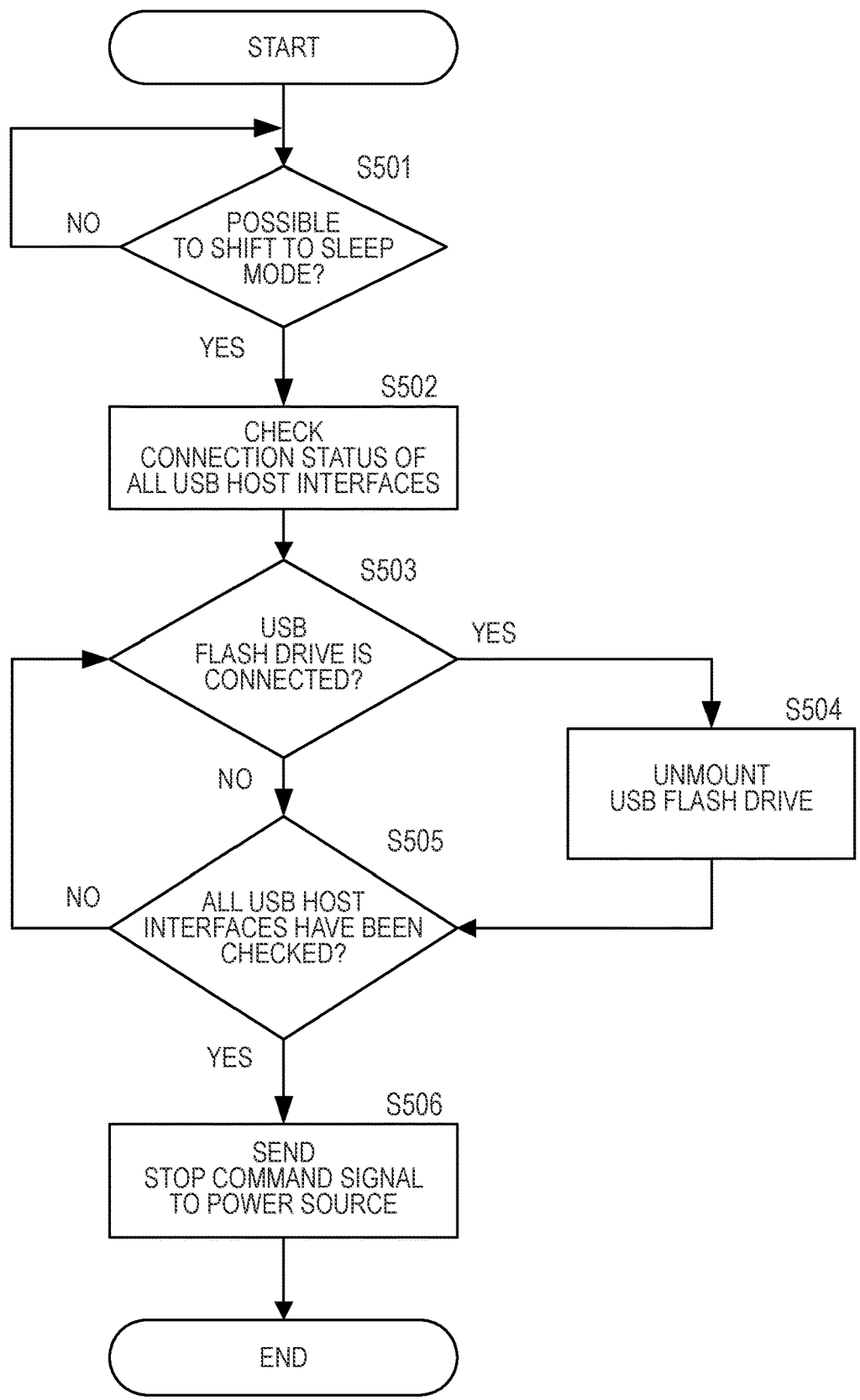
FIG. 5 shows a flowchart for describing the process for the image forming apparatus shifting to the power saving state.

FIG. 5 is a flowchart showing an example of processing in a case of the image forming apparatus 1 shifting the operation from the normal state (401) to the first power saving state (402).

First, in step S501, the CPU 101 monitors whether the image forming apparatus 1 can be shifted to the first power saving state (402). If determined that the image forming apparatus 1 can be shifted to the first power saving state (402) (Yes in step S501), the CPU 101 advances the process to step S502.

In step S502, the CPU 101 checks the connection status of all the USB host interfaces 213 to 216 (hereinafter simply referred to as "USB host interfaces"). Information on the USB devices connected to the USB host interfaces is created in RAM in advance, and the CPU 101 can determine which types of USB devices are connected to which USB host interfaces by referring to the information.

Next, the CPU 101 performs the processes of steps S503 to S505 for each USB host interface (213 to 216) based on the result of step S502.

In step S503, the CPU 101 checks whether an USB flash drive is connected to the USB host interfaces. If the USB flash drive is connected to the USB host interface (Yes in step S503), the CPU 101 executes a process of unmounting the USB Flash drive from the system (step S504), and advances the process to step S505.

If the USB flash drive is not connected (No in step S503), the CPU 101 advances the process to step S505.

In step S505, the CPU 101 determines whether the check of step S503 has been completed for all the USB host interfaces. If there is a USB host interface that has not yet been checked (No in step S505), the CPU 101 returns the process to step S503 and checks the USB host interfaces.

If the check for all the USB host interfaces has been completed (Yes in S505), the CPU 101 advances the process to step S506.

In step S506, the CPU 101 sends a stop command signal to the power source 202. In receipt of the stop command signal, the power source 202 stops power supply for the DC/DC converter 203. As a result, the image forming apparatus 1 is in the first power saving state (402).

Next, the processing in a case where the image forming apparatus 1 returns from the first power saving state (402) to the normal state (401) will be described.

Figure 6:
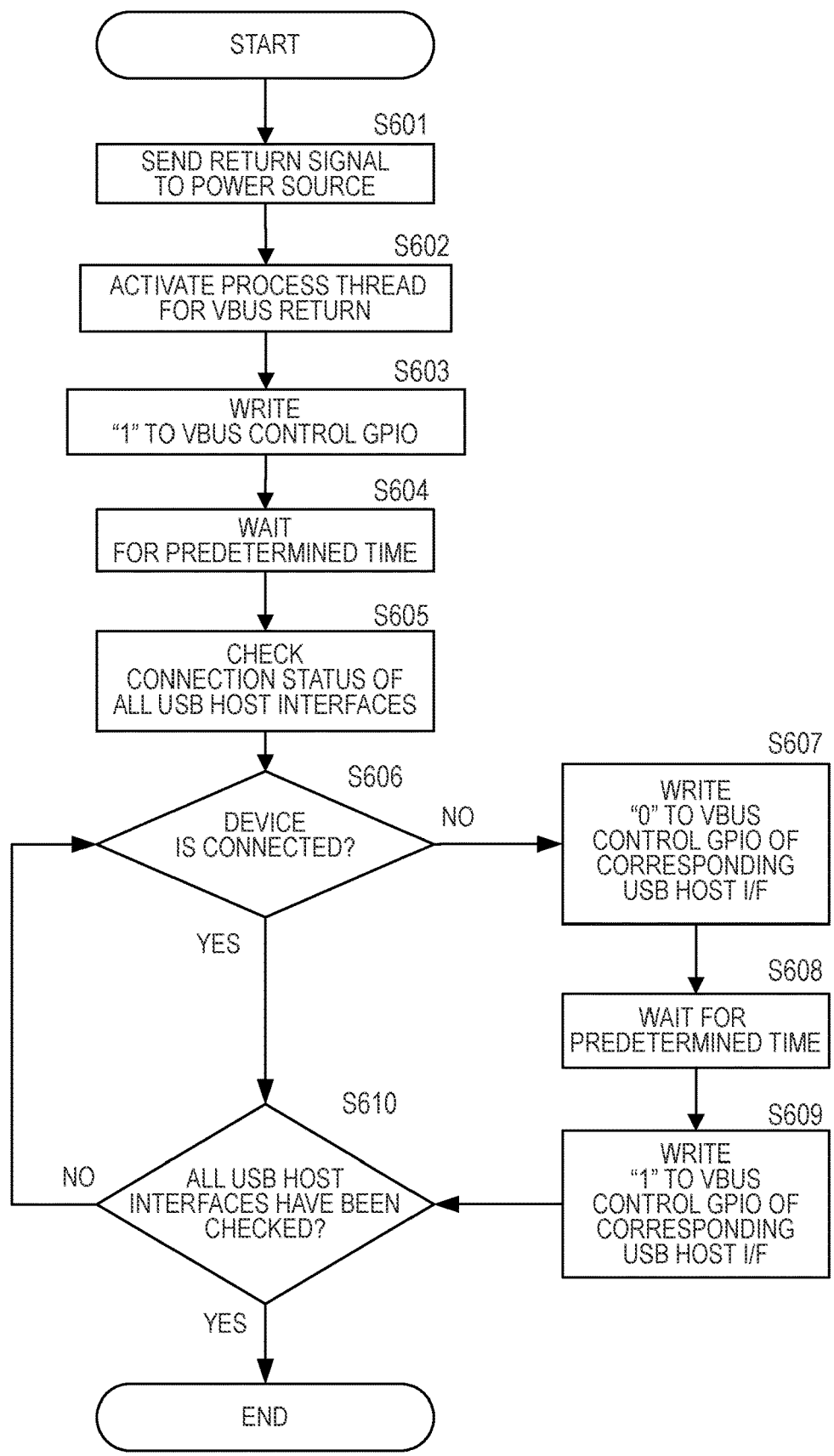
FIG. 6 shows a flowchart for describing the process for the image forming apparatus returning to the normal state.

FIG. 6 is a flowchart showing an example of processing in a case of the image forming apparatus 1 returning from the first power saving state (402) to the normal state (401).

If the processing for returning the image forming apparatus 1 from the first power saving state (402) to the normal state (401) (return processing) is activated, the CPU 101 starts the processing of the flowchart shown in FIG. 6.

First, in step S601, the CPU 101 sends a return signal to the power source 202.

Next, in step S602, the CPU 101 activates a PROCESS THREAD FOR VBUS RETURN to execute the return processing of the USB host interfaces in the thread.

The PROCESS THREAD FOR VBUS RETURN will be described below.

First, in step S603, the CPU 101 writes "1" in all GPIOs (205 to 208) for controlling the Vbus. That is, the CPU 101 outputs a signal (enable signal) to turn on the power supply for the Vbus controller.

Next, in step S604, the CPU 101 advances the process to step S605 after a predetermined waiting time has passed.

In step S605, the CPU 101 checks the connection status of USB devices to each USB host interfaces (213 to 216). The waiting time in step S604 is arranged for waiting for the power supply from the power source 202 to the USB host I/F to be restarted. For example, about 2.5 seconds should be set as the waiting time described above.

Next, the CPU 101 performs the processes of steps S606 to S610 for each USB host interfaces (213 to 216) based on the result of step S605.

In step S606, the CPU 101 determines whether USB devices are connected to the USB host interfaces. If the CPU 101 determines that no USB device is connected to the USB host interfaces (that is, no connection is detected) (No in step S606), the CPU 101 executes the processes of steps S607 to S609 for the USB host interfaces. That is, the CPU 101 writes "0" to the GPIO associated with the Vbus control of the USB host I/F to which no USB device is connected (step S607). That is, the CPU 101 outputs a signal (disable signal) for turning off the power supply for the Vbus controller. Then, after a predetermined waiting time is passed (step S608), the CPU 101 writes "1" to the same GPIO (step S609). That is, the CPU 101 outputs a signal (enable signal) for turning on the power supply for the Vbus controller. Note that the waiting time in step S608 is arranged for waiting for the writing to the GPIO (205 to 208) completed. The required waiting time for step S608 may be about 10 milliseconds, for example.

If the processing in step S609 is completed, the CPU 101 advances the process to step S610.

1 If the CPU 101 determines that an USB device is connected to the USB host interface (Yes in step S606), the CPU advances the process to step S610.

In step S610, the CPU 101 determines whether the determination process of step S606 has been completed for all the USB host interfaces. If there is a USB host interface that has not yet been determined (No in step S610), the CPU 101 returns the process to step S606 to execute the determination process for the undetermined USB host interfaces.

If the determination process of step S606 has been completed for all the USB host interfaces (Yes in step S610), the CPU 101 terminates the PROCESS THREAD FOR VBUS RETURN, and ends the processing of the present flowchart.

In the transition to the first power saving state described above, the downstream voltage and the upstream voltage of the Vbus controller (209 to 213) would normally drop substantially simultaneously after step S506 of FIG. 5. However, depending on the hardware structures of the USB devices connected, there is a case where the voltage drop on the downstream side is delayed so that the voltage on the upstream side drops first. For example, the above case occurs if the connected USB device requires some time to release electric charges held in capacitors of the USB device. In such a case, the low voltage malfunction preventing unit 303 of the Vbus controller (209 to 213) is operated to change the switch unit 301 into the non-conductive state (a state in which the electrical connection is cut off) through the switch controller 302. That is, external devices connected via USB cannot be used after the apparatus returns to the normal state from the power saving state. According to the present invention, the process of steps S607 to S609 shown in FIG. 6 is executed when returning to the normal state from the first power saving state to change the switch unit 301 in the conductive state (i.e., removing the cutoff state of the electrical connection). Thus, the Vbus of the USB host interfaces can be surely restored to the normal state. In addition, activating the PROCESS THREAD FOR VBUS RETURN in step S602 allows to suppress the influence on the restoration process for other applications. Further, the present invention limits the USB host interfaces to be subject to the process of steps S607 to S609 in step S606. Thus, the present invention allows to avoid disconnecting some of the USB host interfaces which have been restored without having a problem.

According to the present embodiment, when the apparatus returns to the normal state from the power saving state, the cutoff state of the electrical connection with USB devices due to the overcurrent preventing mechanism is removed by writing "1" first and then writing "0" to the GPIO. However, the present invention is not limited to the process according to the above embodiment. The present invention may employ any configurations to remove the cutoff state of the electrical connection with USB devices due to the overcurrent preventing mechanism when returning to the normal state from the power-saving state.

The present invention is applicable not only to an image forming apparatus, but also various information processing apparatuses having a USB host interface.

According to the present embodiment, when an information processing apparatus such as an image forming apparatus returns to the normal state from the power-saving state, the present invention allows to reliably restore the information processing apparatus to a state in which the USB host interfaces can be used without affecting the restoration time. That is, the present invention can restore the USB host interfaces to a state in which power can be supplied for external devices, which allows the external devices connected to the USB host interfaces to be usable.

The configurations and contents of the data described above do not limit the present invention. Various configurations and contents of data may be used for the present invention depending on the use and purpose.

Although one embodiment has been described above, the present invention may be implemented as, for example, a system, apparatus, method, program, storage medium, or the like. Specifically, the present invention may be applied to a system comprising multiple apparatuses, or may be applied to an apparatus comprising a single apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention provides a mechanism that can restore the USB host interfaces to a state in which power can be supplied for external devices when the apparatus having the USB host interfaces returns to the normal state from the power-saving state, which allows the external device connected to the USB host I/F to be usable.

This application claims the benefit of Japanese Patent Application No. 2021-144414 filed on Sep. 6, 2021 which is hereby incorporated by reference herein in its entirety.

What is claimed is:

1. An information processing apparatus comprising:
a power source enterable in first and second power states, the second power state providing a lower potential than the first power state;
a USB host interface connected to the power source and operable to supply power to an external device, the USB host interface including a circuit configured to:
turn on/off the power supply based on a predetermined signal; and
electrically cut off a connection with the external device after detecting a state of overcurrent generated during the connection with the external device through the USB host interface; and
a controller configured to:
output first and second signals, wherein:
the first signal is output to the circuit to turn off the power supply, after the power source in the second power state returns to the first power state; and
the second signal is output to turn on the power supply after the first signal is output;
check a connection status of the external device to the USB host interface, after returning to the first power state while in a cut-off connection state where the electrical connection with the external device has been cut off; and
cause the circuit to remove the cut-off connection state, in states where:
the external device is determined to be not connected; and
the second signal is input to the circuit after the first signal is input to the circuit.

2. The information processing apparatus according to claim 1, wherein the controller is further configured to check the connection status of the external device after outputting the second signal to the circuit.

3. The information processing apparatus according to claim 1, wherein the second signal is output in a predetermined period of time after outputting the first signal in a state where the second signal is output after the first signal is output after returning to the first power state.

4. The information processing apparatus according to claim 1, wherein:
the power source is shifted to the second power state, in a state where the information processing apparatus is shifted to a power saving state; and
the power source is returned to the first power state, in a state where the information processing apparatus is returned from the power saving state.

5. The information processing apparatus according to claim 1, wherein the information processing apparatus is an image forming apparatus.

6. A method of controlling an information processing apparatus comprising:
a power source enterable in first and second power states, the second power state providing a lower potential than the first power state;
a USB host interface connected to the power source and operable to supply power to an external device, the USB host interface including a circuit configured to:
turn on/off the power supply based on a predetermined signal; and
electrically cut off a connection with the external device after detecting a state of overcurrent generated during the connection with the external device through the USB host interface,
the method comprising:
outputting first and second signals, wherein:
the first signal is output to the circuit to turn off the power supply, after the power source in the second power state returns to the first power state; and
the second signal is output to turn ON the power supply after outputting the first signal;
checking a connection status of the external device to the USB host interface, after returning to the first power state while in a cut-off connection state where the electrical connection with the external device has been cut off; and
causing the circuit to remove the cut-off connection state, in states where:
the external device is determined to be not connected; and
the second signal is input to the circuit after the first signal is input to the circuit.

7. A non-transitory storage medium storing a program executable by a computer to execute a method of controlling an information processing apparatus comprising:
a power source enterable in first and second power states, the second power state providing a lower potential than the first power state;
a USB host interface connected to the power source and operable to supply power to an external device, the USB host interface including a circuit configured to:
turn on/off the power supply based on a predetermined signal; and
electrically cut off a connection with the external device after detecting a state of overcurrent generated during the connection with the external device through the USB host interface,
the method comprising:
outputting first and second signals, wherein:
the first signal is output to the circuit to turn off the power supply, after the power source in the second power state returns to the first power state; and
the second signal is output to turn ON the power supply after outputting the first signal;
checking a connection status of the external device to the USB host interface, after returning to the first power state while in a cut-off connection state where the electrical connection with the external device has been cut off; and
causing the circuit to remove the cut-off connection state, in states where:
the external device is determined to be not connected; and
the second signal is input to the circuit after the first signal is input to the circuit.

* * * * *